United States Patent Office 3,007,228
Patented Nov. 7, 1961

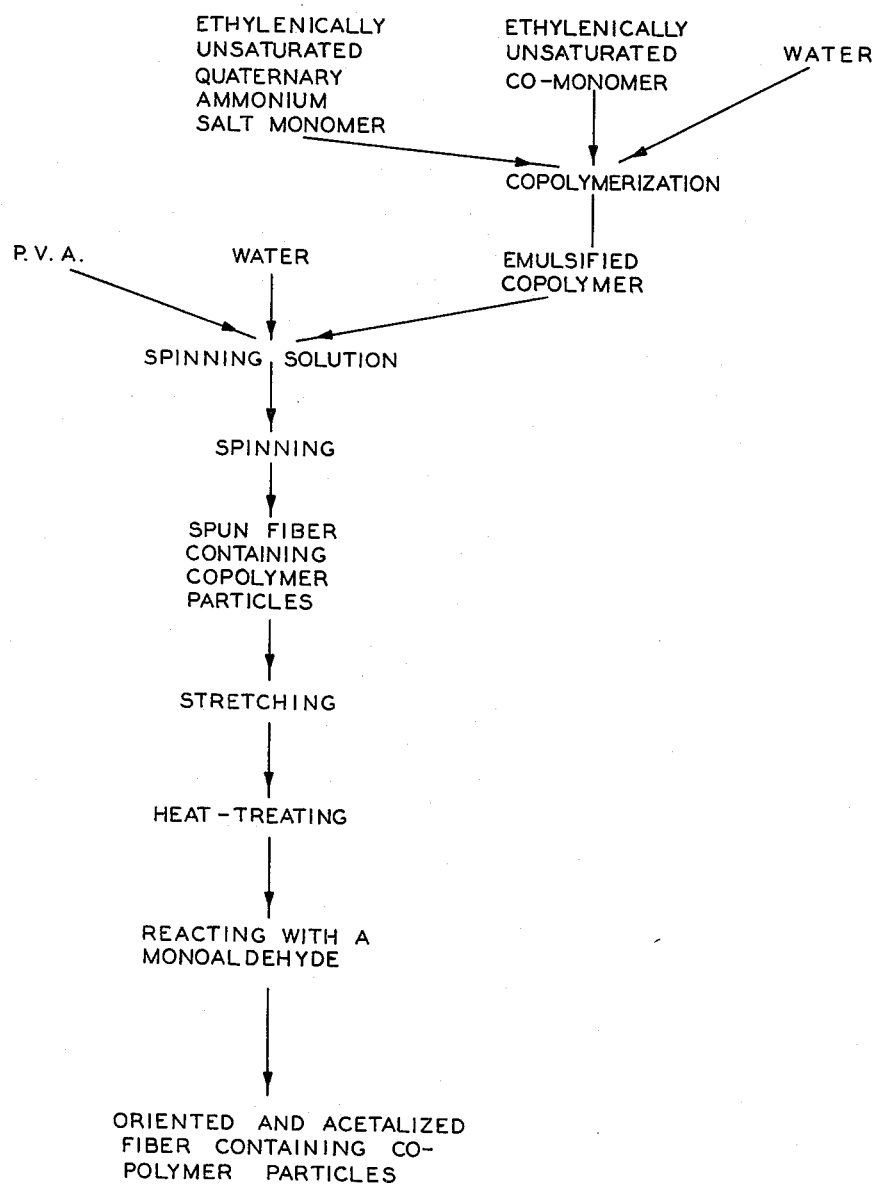

3,007,228
POLYVINYL ALCOHOL FIBER PRODUCTION
Kanji Matsubayashi, Kiyoshi Ueno, and Kenichi Tanabe, Kurashiki City, Japan, assignors of three-fourths to Kurashiki Rayon Co., Ltd., Okayama Prefecture, Japan, a corporation of Japan, and one-fourth to Air Reduction Company Incorporated, New York, N.Y., a corporation of New York
Filed Dec. 1, 1959, Ser. No. 856,334
Claims priority, application Japan Dec. 5, 1958
16 Claims. (Cl. 28—82)

This invention relates to the preparation of improved polyvinyl alcohol fibers.

Methods are known for the production of polyvinyl alcohol fibers. Although polyvinyl alcohol fibers find wide utility in a number of applications, a serious disadvantage generally found with such fibers is their inferior dyeing characteristics. Various methods have been proposed whereby the dyeing characteristics of polyvinyl alcohol fibers can be improved. One such method involves the preparation of fibers from a polyvinyl alcohol spinning solution in which has been incorporated a polymer emulsion containing an emulsified basic nitrogen polymer. See the Osugi et al. application Serial Number 666,985, filed June 22, 1957.

It is an object of this invention to provide an improved polyvinyl alcohol spinning solution from which polyvinyl alcohol fibers can be formed.

Another object is to provide an improved method for forming polyvinyl alcohol fibers.

Still another object is to provide for the production of improved polyvinyl alcohol fibers.

Other objects will become apparent from the following description of the invention.

The drawing is a flow sheet showing steps which may be employed in preparing the polyvinyl alcohol fibers of the present invention.

In accordance with the present invention, a copolymer emulsion containing a copolymerized ethylenically unsaturated quaternary ammonium salt is blended with polyvinyl alcohol and water to form a spinning solution which is characterized by exceptional stability. Polyvinyl alcohol fibers characterized by improved dyeing properties are then formed from the said spinning solution.

In preparing the copolymer emulsion, an ethylenically unsaturated quaternary ammonium salt monomer is copolymerized with an ethylenically unsaturated comonomer to form a water-insoluble copolymer. The copolymerization is carried out under emulsion polymerization conditions to produce a stable copolymer emulsion.

In order to produce a stable copolymer emulsion, the ethylenically unsaturated quaternary ammonium salt monomer is employed in amounts ranging from about 1 to 50 mol percent of the total monomers used in the copolymerization. Generally, the more hydrophilic the quaternary ammonium salt monomer and/or the less hydrophobic the ethylenically unsaturated comonomer, the lower the amount of quaternary ammonium salt monomer necessary to produce a stable copolymer emulsion.

Specific examples of ethylenically unsaturated quaternary ammonium salt monomers which can be used include:

1-methyl-4-vinyl-pyridinium chloride,
1-ethyl-2-vinyl-pyridinium chloride,
1-methyl-3-vinyl-pyridinium iodide,
4-vinyl-pyridine betaine,
1-ethyl-2-methyl-3-vinyl-pyridinium bromide,
1-butyl-5-ethyl-2-vinyl-pyridinium bromide,
1-benzyl-2-methyl-5-vinyl-pyridinium chloride,
1-dodecyl-2-methyl-5-vinyl-pyridinium bromide,
1-methyl-2-methyl-5-vinyl-pyridinium methyl sulfate,
di-(1-methyl-2-methyl-5-vinyl-pyridinium) sulfate,
1-methyl-2-methyl-5-vinyl-pyridinium p-toluene sulfonate,
4-vinyl-pyridinium-β-hydroxyethyl chloride,
1-ethyl-2-vinyl-quinolinium bromide,
N,N,N-triethyl - N-(2 - methacryloxyethyl) - ammonium iodide,
Allyltriethyl-ammonium bromide, and the like. Other similar monomers can be employed. Mixtures of the quaternary ammonium salt monomers can be employed.

Specific examples of ethylenically unsaturated monomers which are copolymerized with the said quaternary ammonium salt include 2-vinyl pyridine, 3-vinyl pyridine, 4-vinyl pyridine, 2-methyl-5-vinyl pyridine, 5-ethyl-2-vinyl pyridine, vinyl quinoline, styrene, divinyl benzene, β-vinyl naphthalene, vinyl carbazole, vinyl chloride, vinylidene chloride, vinyl acetate, vinyl benzoate, acrylonitrile, vinylidene cyanide, methyl acrylate, methyl methacrylate, butyl methacrylate, methyl vinyl ketone, diallyl phthalate, allyl chloride, allyl acetate, N,N-diethylaminomethacrylate, and the like. Mixtures of the said monomers can be used.

The copolymerization is carried out under emulsion conditions to produce a stable copolymer emulsion. The monomers are dispersed in an aqueous medium preferably in amounts of 1 to 50 percent by weight of the combined weight of monomer and water. Polymerization initiators with or without reducing agents can be employed. Heat, light or ultraviolet radiation can be used to promote the polymerization. It is desirable to provide suitable agitation of the polymerization mixture during the polymerization as by mechanical stirring.

Polymerization initiators which can be employed include hydrogen peroxide, ammonium or potassium persulfate, tertiary butyl hydroperoxide, and the like. Reducing agents which can be employed to provide a redox-type catalyst system include ferrous salts, oxalic acid, sodium potassium tartarate, sodium thiosulfate, sodium acid sulfite, and the like. Generally the initiators and reducing agents are suitably employed each in amount of 0.01 to 5 percent by weight of the monomers.

Polymerization temperatures in the range of about 20 to 100° C. can be employed. Suitable polymerization times range from several minutes, e.g. 10 minutes, to about 10 hours.

Stable emulsions can be prepared without the use of added emulsifying agents. However, if desired, cationic, non-ionic, or anionic agents such as dodecyl-trimethyl-ammonium chloride, polyoxyethylene dodecyl ether, sodium dodecyl sulfate, and the like can be employed.

In practice of this invention, the stable copolymer emulsion is uniformly admixed with polyvinyl alcohol and water to provide an improved polyvinyl alcohol spinning solution. As polyvinyl alcohol, macromolecular synthetic, linear hydroxylated polymers consisting of at least 95 percent by weight of vinyl alcohol units

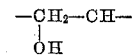

are employed. The polyvinyl alcohol has a degree of polymerization of more than 700 and preferably of 900–2500.

The quaternary ammonium salt copolymer emulsion is admixed with the polyvinyl alcohol and water to form a spinning solution containing 65–99.5% polyvinyl alcohol based on the total polymer weight, and containing 0.05–5% nitrogen and preferably 0.1 to 2% nitrogen based on the total polymer weight. The nitrogen can be derived entirely from the copolymerized quaternary ammonium salt monomer, or where the quaternary ammonium salt monomer is copolymerized with a nitrogen-containing monomer such as 2-vinyl pyridine the nitrogen can be derived from both copolymerized compounds. The total polymer concentration in the aqueous spinning solution suitably is about 10–50 percent by weight of the solution, preferably 25–50 percent for dry spinning and 10–25 percent for wet spinning techniques. The said spinning solution is characterized by exceptionally high stability even upon prolonged standing. Substantially no operational difficulties such as clogging of spinneret holes due to solution coagulation are encountered in forming fibers from the said spinning solution.

The spinning solution is extruded through small holes into a medium effective to remove water to form filaments. In dry spinning the preferred medium for removing water is air at 50–180° C. although inert gases such as nitrogen are sometimes employed. In wet spinning a concentrated aqueous solution of sodium sulfate or ammonium sulfate is preferably employed at temperatures of 30–55° C.

The filaments obtained by the above process are desirably stretched to a draw ratio of 2:1–12:1. For wet filaments after spinning the stretching can be effected at room temperature up to about 5:1, while it is preferable to effect the stretch of higher degree in a heated medium such as air at a temperature of 100–250° C.

Then the filaments as above oriented are subjected to a heat-treatment until they show wet-softening temperatures of higher than 60° C. This is usually attained by heating the filament in air at 210–250° C. for two seconds to five minutes.

Finally the filaments are subjected to an insolubilizing treatment. Preferably the filaments are acetalized by reaction with an aldehyde or with a compound such as an acetal which forms an aldehyde at the reaction conditions. Other insolubilizing treatments can be employed such as reaction with titanium or chromium compounds. Examples of aldehydes, suitably used in the acetalization are formaldehyde, acetaldehyde, chloracetaldehyde, butyraldehyde, nonylaldehyde, benzaldehyde, monochlorbenzaldehyde, 1-naphthaldehyde, glyoxal, malonaldehyde, terephthaldehyde, and the like. Aldehydes having about 20 or fewer carbon atoms are employed. The acetalization is carried out until 5–50% of the hydroxyl groups in the filament have been acetalized. The acetalization is generally carried out in an aqueous medium which contains by weight 0.2–10% aldehyde, 5–20% sulfuric acid, and 0–25% sodium or ammonium sulfate at temperatures of 40–80° C. for a few minutes to several hours.

It has previously been known that the elastic properties of polyvinyl alcohol fibers could be greatly improved by acetalization with higher aldehydes such as benzaldehyde. However, such prior acetalizations resulted in considerable degradation of the fiber dyeing properties. It is an outstanding advantage of the present invention that the filaments prepared by this invention can be acetalized with higher aldehydes such as benzaldehyde to improve the elastic and other properties while still retaining good fiber dyeability.

The novel polyvinyl alcohol spinning solutions prepared by this invention are characterized by extreme stability even over a wide range of conditions. Various materials including starch, polyvinyl pyrrolidone, polyacrylamide, partially cyanoethylated polyvinyl alcohol, pigments such as titanium dioxide, anionic, cationic, and non-ionic surfactants, acids, bases, salts such as sodium sulfate, and the like can be added to the spinning solution for the purposes of regulating fiber properties such as transparency, cross-sectional configuration, and the like without causing coagulation or precipitation of the spinning solution.

The fibers produced by the invention are more easily spun into yarns because of the presence of the solid polymer particles therein. Frictional resistance is lessened due to projection of the solid particles from the filament surface.

The fibers produced by the invention are characterized by the high strength and other properties of polyvinyl alcohol fibers as well as by the additional property of excellent dyeability.

The following examples illustrate the invention:

EXAMPLE I

A mixture of 595 grams of 2-methyl-5-vinyl pyridine, 1090 grams of ethyl bromide and a polymerization inhibitor, and 12 grams of tertiary butyl pyrocatechol were reacted in a hermetically sealed tube at 60° C. for 24 hours. The reaction product was filtered, washed with acetone, and dried under vacuum at room temperature. About 600 grams of white crystalline product was obtained. A mixture was then prepared comprising 5 liters of water, 160 grams of 1-ethyl-2-methyl-5-vinyl-pyridinium bromide prepared above, 750 grams of 2-methyl-5-vinyl-pyridinium, and 750 grams of a mixture of divinyl benzene and ethyl vinyl benzene containing 38% divinyl benzene. To this mixture was added 4.4 grams of sodium bisulfite followed by the addition of 8 grams of potassium persulfate with stirring at 60° C. in order to polymerize the monomer. The polymerization reaction was substantially complete in about 2 hours. Unreacted monomers were removed by steam distillation. The product polymer emulsion was filtered through a metal cloth. About 7.54 kilograms of a polymer emulsion containing 11.7% polymer solids was obtained. The polymeric particles in the emulsion had a substantially uniform particle size of the order of 0.1 micron diameter. Microscopic observation indicated no coagulated material having a diameter of greater than 10 microns. The nitrogen content of the polymer was 9.2% by weight.

The emulsion obtained as above described was admixed with 27.8 kilograms of particulate polyvinyl alcohol containing 45% water. Additional water was added to dissolve the polymeric material to produce an aqueous spinning solution having a polymer concentration by weight of 38%.

The spinning solution was passed through two candle filters and then spun into filaments. The spinning solution prior to spinning was maintained at a temperature of the order of 100° C. for 30 hours. The highest temperature reached during this time was 130° C. Examination of the spinning solution prior to spinning disclosed that the solution contained no coagulating material having a diameter of more than 10 microns. The spinning solution was extruded through a 30 hole spinneret, each hole having a 0.2 mm. diameter, into air to form filaments. The filaments were stretched 500% at 220° C. and then subjected to 20% shrinkage at 225° C. The thusly formed fibers contained 0.5% by weight nitrogen.

The fibers were acetalized at 60° C. for 2 hours in a bath containing 20 grams per liter of formaldehyde, 150 grams per liter of sulfuric acid, and 150 grams per liter of sodium sulfate. The degree of acetalization was 37%. The resulting fibers shrank 2.8% in boiling water for 1 hour and had a dry tenacity of 4.8 g./d.

When dyed at 80° C. for 1 hour using a bath containing by weight of fiber 4% Acid Brilliant Scarlet and 2% sulfuric acid, or 2% Nippon Fast Violet BB and 10% sodium sulfate, the fibers absorbed 95% of the Acid Brilliant Scarlet, and 97% of the Nippon Fast Violet BB. By way of contrast, polyvinyl alcohol fibers prepared as above described without the addition of nitrogen-containing polymer absorbed 0% of the Acid Brilliant Scarlet and only 5% of the Nippon Fast Violet BB.

Further, by way of contrast, a spinning solution was prepared which was similiar to that described above except that the polymer emulsion added thereto did not contain a polymerized quaternary ammonium salt monomer. When preparing fibers from the said spinning solution, coagulation occurred as a result of the prolonged storage of the spinning solution, and considerable difficulty was encountered during the spinning operation.

EXAMPLE II

A solution was prepared containing 59.5 grams of 2-methyl-5-vinyl pyridine, 0.5 gram of tertiary butyl pyrocatechol, a polymerization inhibitor, and 300 grams of acetone. Over a period of 3 hours, 63 grams of dimethyl sulfate was added to the said solution while the solution was stirred and the temperature was maintained at 30° C. After standing all night, the reaction mixture was filtered, washed with acetone, and dried under vacuum at room temperature. A white crystalline product 1-methyl-2-methyl-5-vinyl-pyridinium methyl sulfate was obtained in a yield of 95%. The nitrogen content by weight of the said product was 5.67%.

A mixture of 1 liter of water, 51.5 grams of the above product, and 142 grams of 2-methyl-5-vinyl pyridine was prepared. To this mixture was added 1 gram of sodium bisulfite and then 1.5 grams of ammonium persulfate to promote polymerization of the monomers. The polymerization mixture was stirred at 60° C. for 4 hours. Unreacted monomers were removed by steam distillation. After dialysis about 1.8 kilograms of a polymer emulsion containing 10% by weight polymer solids was obtained.

The polymer emulsion was mixed at 95° C. with 10.8 kilograms of an aqueous solution containing 1.62 kilograms of polyvinyl alcohol and 360 grams of water soluble starch. To this admixture, water was added to make a total spinning solution having a weight of 14.5 kilograms. The spinning solution was filtered, and after storage at 90° C. for 3 days the spinning solution was again filtered. No coagulated material was obtained as a result of the filtrations. After storage, no coagulated material having a diameter greater than 10 microns was observed.

The spinning solution was wet spun by known techniques into a sodium sulfate coagulating bath to form filaments. The filaments were heat stretched at constant length for 30 seconds at 235° C. After washing with water, the filaments were acetalized in an aqueous medium containing by weight 2% benzaldehyde, 10% sulfuric acid, and 40% methanol at 60° C. for 1 hour. The resulting filaments had a degree of acetalization of 22%. The filaments had a shrinkage in boiling water up to 1 hour of 7.5%, a dry tenacity of 3.1 g./d., and extremely good elastic properties.

When dyed at 90° C. in a bath containing by weight of the filaments 4% of Acid Brilliant Scarlet and 10% of acetic acid, or 2% of Nippon Fast Violet BB, the filaments absorbed 80% and 75% respectively of the dyes. Additionally, the dyed fibers had a clear deep color due to the homogeneous cross section of the fibers.

By way of comparison, 2.2 kilograms of a polymer emulsion containing 9.2% solids was obtained after 4 hours polymerization at 60° C. of a mixture of 167 grams of 2-methyl-5-vinyl pyridine, 10 grams of an anionic surface active agent, 45 grams of polyvinyl alcohol, 1.5 liters of water, 1 gram of sodium bisulfite, and 1.5 grams of ammonium persulfate. With stirring, the emulsion was admixed at 95° C. with 1.6 kilograms of polyvinyl alcohol wetted with water over a 5 hour period. About 360 grams of water soluble starch was then added to the mixture followed by the addition of water, making the total spinning solution weight of 14.5 kilograms. After filtration, the spinning solution was stored at 90° C. for 3 days. During this period coagulated material gradually separated from the spinning solution. After storage, additional filtration was difficult to perform. Examination of the spinning solution indicated that large quantities of coagulated material were contained therein having a diameter in excess of 30 microns. When the spinning solution was employed in a wet spinning process, it was exceedingly difficult to continue the spinning for prolonged periods due to clogging of the spinneret filter with coagulated material from the spinning solution.

EXAMPLE III

A mixture of 105 grams of 4-vinyl pyridine, 126.5 grams of benzyl chloride, and 2 grams of tertiary butyl pyrocatechol was heated at 60° C. for 24 hours. The product crystals were filtered, washed with acetone, and dried under vacuum. About 80 grams of 1-benzyl-4-vinyl-pyridinium chloride were obtained.

A mixture of 10 grams of the above product, 6 grams of 4-vinyl pyridine, 48 grams of styrene, and 100 grams of water was emulsion polymerized at 20° C. for 2 hours with the addition of 0.15 gram of potassium persulfate and sodium bisulfite. The average size of the polymer particles was about 0.2 micron diameter.

The polymer emulsion was admixed with 323 grams of polyvinyl alcohol and sufficient water to make a total spinning solution weight of 2.6 kilograms. This spinning solution was formed into filaments by known wet spinning techniques. Sample 1 of the resulting filaments was heat treated at 235° C., for 30 seconds at constant length. Sample 2 of the filaments was stretched 180% at 230° C. for 30 seconds and then subjected to 20% heat shrinkage at 235° C. for 30 seconds. In addition, for the sake of comparison, filaments were formed in a similar manner from a spinning solution containing only polyvinyl alcohol. These filaments, designated as sample 3, were hot stretched 180% at 230° C. for 30 seconds and then subjected to 20% heat shrinkage at 235° C. for 30 seconds. Various properties of the fiber samples are given in Table 1 below. A consideration of the results presented in Table 1 show that fiber samples 1 and 2 are considerably better in dyeing properties than the fibers of sample 3.

Sample 2 fibers have more favorable strength and hot water resistance than do the fibers of sample 1. A microscopic examination of the surfaces of samples 1 and 2 fibers discloses spherical projections of about 0.2 micron in diameter from the surfaces of the said fibers. These spherical projections lessen the frictional resistance of the fibers and improve their spinning properties.

*Table 1*

|  | (1) | (2) | (3) |
|---|---|---|---|
| Hot Stretch, Percent | 0 | 180 | 180 |
| Nitrogen content, percent by weight | 0.35 | 0.36 | 0 |
| Degree of formalization, percent | 36.5 | 30.3 | 29.5 |
| Shrinkage in boiling water for one hour, percent | 6.0 | 2.8 | 2.5 |
| Temperature of air bath at time of 10% shrinkage, ° C | 205 | 218 | 216 |
| Dry Tenacity, g./d | 3.5 | 6.5 | 6.8 |
| Elongation, percent | 31 | 18 | 19 |
| Rate of dye absorption, percent: |  |  |  |
| Acid dye | 65 | 85 | 0 |
| Direct dye | 50 | 55 | 5 |

EXAMPLE IV

The emulsion copolymerization described in Example I was repeated a number of times to obtain 45.8 kilograms of copolymer emulsion containing by weight 11.5% polymer solids. To this emulsion was added 4.2 kilograms of an aqueous solution containing 200 grams of an anionic surface active agent comprising mainly the sodium salt of the octyl ester of sulfosuccinic acid. The resulting emulsion was admixed with a concentrated solution of polyvinyl alcohol in water to form a spinning solution containing 35% by weight of polymer. The ratio of emulsified copolymer to polyvinyl alcohol by weight in the spinning solution was 5% to 95%.

The spinning solution prepared as above described was continuously employed in the dry spinning of polyvinyl alcohol fibers involving passing the spinning solution into air through a 20 hole spinneret, each hole having a diameter of 0.3 mm. No unusual difficulties were encountered during the two weeks spinning operation.

The spun fibers were hot stretched and heat treated as described in Example I. The thusly dried fibers were acetalized as described in Example II. The fibers thus obtained had a nitrogen content by weight of 0.4%, degree of acetalization with benzaldehyde of 25.5%, 6.5% shrinkage in boiling water for 1 hour, 3.5 g./d. dry tenacity, and elastic recovery of 85% at 2% elongation. The fibers could be dyed to clear deep colors by various acid and direct dyes.

We claim:

1. An improved polyvinyl alcohol spinning solution comprising by weight 50% to 90% water and containing polyvinyl alcohol and an emulsified water-insoluble copolymer of an ethylenically unsaturated monomer containing a quaternary ammonium group and an ethylenically unsaturated comonomer, free from quaternary ammonium groups and copolymerizable with said monomer, said monomer containing the quaternary ammonium group comprising 1 to 50 mol percent of said copolymer, the polyvinyl alcohol comprising 65 to 99.5% by weight of the total polymers in said solution, and said total polymers consisting of 0.05 to 5% by weight of nitrogen.

2. The method of forming improved polyvinyl alcohol fibers which comprises forming a polyvinyl alcohol spinning solution comprising by weight 50% to 90% water and containing polyvinyl alcohol and an emulsified water-insoluble copolymer of an ethylenically unsaturated monomer containing a quaternary ammonium group and an ethylenically unsaturated comonomer free from quaternary ammonium groups and copolymerizable with said monomer, said monomer containing the quaternary ammonium group comprising 1 to 50 mol percent of said copolymer, the polyvinvyl alcohol comprising 65 to 99.5% by weight of the total polymers in said solution, and said total polymers consisting of 0.05 to 5% by weight of nitrogen, and extruding the solution into a medium capable of extracting the solvent to form improved polyvinyl alcohol fibers.

3. The method of forming improved polyvinyl alcohol fibers which comprises forming a polyvinyl alcohol spinning solution comprising by weight 50% to 90% water and containing polyvinyl alcohol and an emulsified water-insoluble copolymer of an ethylenically unsaturated monomer containing a quaternary ammonium group and an ethylenically unsaturated comonomer free from quaternary ammonium groups and copolymerizable with said monomer, said monomer containing the quaternary ammonium group comprising 1 to 50 mol percent of said copolymer, the polyvinyl alcohol comprising 65 to 99.5% by weight of the total polymers in said solution, and said total polymers consisting of 0.05 to 5% by weight of nitrogen, extruding the solution into a medium capable of extracting the solvent, stretching the resulting filaments to a draw ratio of 2:1 to 12:1, heat treating the oriented filaments until the filaments shrink not more than 10% when immersed in water at 60° C. for 30 minutes, and reacting the heat set, oriented, filaments with a monoaldehyde having not more than 20 carbon atoms until 5–50% of the hydroxyl groups in the filaments have reached with the aldehyde.

4. An oriented polyvinyl alcohol fiber consisting of vinyl alcohol units of which 5–50% are acetalized, and containing particles of a water-insoluble copolymer of an ethylenically unsaturated monomer containing a quaternary ammonium group and an ethylenically unsaturated comonomer free from quaternary ammonium groups and copolymerizable with said monomer, said monomer containing the quaternary ammonium group comprising 1 to 50 mol percent of said copolymer, said fiber on a non-acetalized basis consisting of 65 to 99.5% by weight of polyvinyl alcohol and 0.05 to 5% by weight nitrogen.

5. The spinning solution of claim 1 wherein said total polymers consist of 0.1 to 2% by weight of nitrogen.

6. The method of claim 2 wherein said total polymers consist of 0.1 to 2% by weight of nitrgogen.

7. The method of claim 3 wherein said total polymers consist of 0.1 to 2% by weight of nitrogen.

8. The polyvinyl alcohol fiber of claim 4 wherein said fiber on a non-acetalized basis consists of 0.1 to 2% by weight of nitrogen.

9. A spinning solution as defined in claim 1, wherein said ethylenically unsaturated monomer containing a quaternary ammonium group is a quaternary vinyl pyridine compound.

10. A method as defined in claim 2, wherein said ethylenically unsaturated monomer containing a quaternary ammonium group is a quaternary vinyl pyridine compound.

11. A method as defined in claim 3, wherein said ethylenically unsaturated monomer containing a quaternary ammonium group is a quaternary vinyl pyridine compound.

12. An oriented fiber as defined in claim 4, wherein said ethylencially unsaturated monomer containing a quaternary ammonium group is a quaternary vinyl pyridine compound.

13. A spinning solution as defined in claim 1, wherein said ethylenically unsaturated monomer containing a quaternary ammonium group is a quaternary vinyl pyridine compound and wherein said comonomer is a cyclic vinyl compound.

14. A method as defined in claim 2, wherein said ethylenically unsaturated monomer containing a quaternary ammonium group is a quaternary vinyl pyridine compound and wherein said comonomer is a cyclic vinyl compound.

15. A method as defined in claim 3, wherein said ethylenically unsaturated monomer containing a quaternary ammonium group is a quaternary vinyl pyridine compound and wherein said comonomer is a cyclic vinyl compound.

16. An oriented fiber as defined in claim 4, wherein said ethylenically unsaturated monomer containing a quaternary ammonium group is a quaternary vinyl pyridine compound and wherein said comonomer is a cyclic vinyl compound.

References Cited in the file of this patent

UNITED STATES PATENTS 2,895,786    Schlack _____ July 21, 1959

FOREIGN PATENTS 732,934    Great Britain _____ June 29, 1955

UNITED STATES PATENT OFFICE
CERTIFICATE OF CORRECTION

Patent No. 3,007,228            November 7, 1961

Kanji Matsubayashi et al.

It is hereby certified that error appears in the above numbered patent requiring correction and that the said Letters Patent should read as corrected below.

Column 2, line 25, after "-diethylamino-" insert -- ethyl --; column 5, line 29, for "equeous" read -- aqueous --; column 7, line 60, for "reached" read -- reacted --.

Signed and sealed this 10th day of April 1962.

(SEAL)
Attest:

ERNEST W. SWIDER            DAVID L. LADD

Attesting Officer            Commissioner of Patents